(12) United States Patent
Trestman

(10) Patent No.: US 7,276,859 B1
(45) Date of Patent: Oct. 2, 2007

(54) THREE-PHASE ELECTRONIC BALLAST WITH IMPROVED THREE-PHASE EMI FILTER

(75) Inventor: Grigoriy A. Trestman, Salem, MA (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 11/536,510

(22) Filed: Sep. 28, 2006

(51) Int. Cl.
*H05B 37/00* (2006.01)

(52) U.S. Cl. ............... 315/224; 315/137; 315/251; 315/DIG. 5; 363/89; 363/37

(58) Field of Classification Search ........ 315/317–140, 315/224, 246, 250–251, 258, 276–278, 289, 315/291, DIG. 5, DIG. 7; 363/36–37, 44, 363/48, 84, 89
See application file for complete search history.

(56) References Cited

U.S. PATENT DOCUMENTS

| | | | |
|---|---|---|---|
| 5,654,882 A * | 8/1997 | Kanazawa et al. ............ | 363/37 |
| 5,886,891 A * | 3/1999 | Jiang et al. .................... | 363/84 |
| 6,043,997 A | 3/2000 | He et al. ........................ | 363/44 |
| 6,181,076 B1 * | 1/2001 | Trestman et al. ........... | 315/224 |
| 6,343,021 B1 | 1/2002 | Williamson .................... | 363/8 |
| 6,567,283 B2 * | 5/2003 | Welches ....................... | 363/89 |
| 6,906,474 B2 | 6/2005 | Trestman et al. ........... | 315/224 |
| 2004/0085032 A1 | 5/2004 | Eckert ........................ | 315/291 |
| 2005/0067974 A1 * | 3/2005 | Trestman et al. ........... | 315/224 |

* cited by examiner

*Primary Examiner*—Thuy V. Tran
*Assistant Examiner*—Tung X Le
(74) *Attorney, Agent, or Firm*—Carlo S. Bessone

(57) ABSTRACT

A ballast (20) for powering at least one gas discharge lamp (52) from a three-phase AC voltage source (30) comprises a three-phase rectifier circuit (200), a high frequency filter capacitor (300), a high frequency inverter (400), and a three-phase EMI filter (500). Three-phase EMI filter (500) comprises a common-mode EMI inductor (510), a Y-capacitor (540), and a plurality of X-capacitors (550,560,570). Common-mode EMI inductor (510) comprises three magnetically coupled windings (512,514; 522,524; 532,534) each of which is, preferably, split into two equal winding sections. Ballast (20) and three-phase EMI filter (500) provide substantial cost and performance benefits in comparison with existing approaches.

20 Claims, 3 Drawing Sheets

THREE-PHASE ELECTRONIC BALLAST WITH IMPROVED THREE-PHASE EMI FILTER

FIELD OF THE INVENTION

The present invention relates to the general subject of circuits for powering discharge lamps. More particularly, the present invention relates to a three-phase electronic ballast having an improved three-phase electromagnetic interference (EMI) filter.

RELATED APPLICATIONS

The subject matter of the present application is related to that which is disclosed in U.S. Pat. No. 6,906,474 B2 (titled "Three-Phase Electronic Ballast," issued on Jun. 14, 2005, and assigned to the same assignee as the present application), the disclosure of which is incorporated herein by reference.

BACKGROUND OF THE INVENTION

U.S. Pat. No. 6,906,474 B2 (Trestman et al.) discloses an electronic ballast for powering one or more gas discharge lamps from a three-phase alternating current (AC) voltage source. U.S. Pat. No. 6,906,474 B2 teaches that, in comparison with conventional single-phase electronic ballasts, a three-phase electronic ballast provides significant advantages such as increased energy efficiency and improved reliability.

An essential component of a three-phase electronic ballast is an electromagnetic interference (EMI) filter that provides attenuation of high frequency noise generated by operation of a high frequency inverter. The level of attenuation that must be provided by the EMI filter is dictated by the standards established by certain regulatory agencies [e.g., the Federal Communications Commission (FCC) in the United States, and similar agencies in other countries].

The noise that is generated due to operation of a high frequency inverter consists of two components—a common-mode noise component and a differential-mode noise component. Of those two components, the common-mode component is typically prevalent. To effectively attenuate both the common-mode and differential-mode noise components, as well as to prevent the common-mode noise component from reaching the AC line source, it is necessary to have an EMI filter that fulfills the following requirements: (1) a filter inductor having a high impedance; and (2) low intrawinding capacitances (i.e., the parasitic capacitance that typically exists between layers of an inductor winding and that effectively create a circuit path which allow high frequency noise to bypass the inductor); and (3) sufficient X-capacitances, in order to effectively attenuate the differential-mode noise component; and (4) sufficient Y-capacitance, in order to provide a low impedance return path for the common-mode noise component that is injected into the ground wire by operation of the high frequency inverter.

FIG. 1 describes a preferred embodiment of a three-phase electronic ballast 10 disclosed in U.S. Pat. No. 6,906,474 B2. As depicted in FIG. 1, EMI filter 100 comprises three differential mode type inductors 102,104,106, two X-capacitances 112,114, and one Y-capacitance 120. In a practical realization of ballast 10, each X-capacitance must be sized (i.e., in terms of voltage rating) to withstand the maximum phase-to-phase voltage provided by three-phase AC voltage source 30. In the case of a three-phase AC voltage source having a nominal phase-to-phase voltage of 480 volts (rms), and in view of a possible variation (from nominal) of up to +/−10%, each of X-capacitances 112,114 must be capable of withstanding at least 528 volts (rms), which dictates that X-capacitances 112,114 must be realized using X-capacitors rated at 600 VAC. However, because standard 600 VAC rated X-capacitors are not currently available, each of X-capacitances 112,114 must be realized using a series combination of two 300 VAC rated X-capacitors. Thus, EMI filter 100 requires a total of four individual X-capacitors (each having a 300 VAC rating) in order to implement the two X-capacitances 112,114. This requirement detracts from the cost-effectiveness of implementing EMI filter 100.

Thus, a need exists for a three-phase ballast having a three-phase EMI filter that is capable of being realized in a more cost-effective manner than the prior art approach. A further need exists for a three-phase EMI filter that provides improved EMI suppression and/or added safety benefits over the prior art approach. Such a ballast and EMI filter would represent a significant advance over the prior art.

DETAILED DESCRIPTION OF THE PREFERRED EMBODIMENTS

Figure 2:
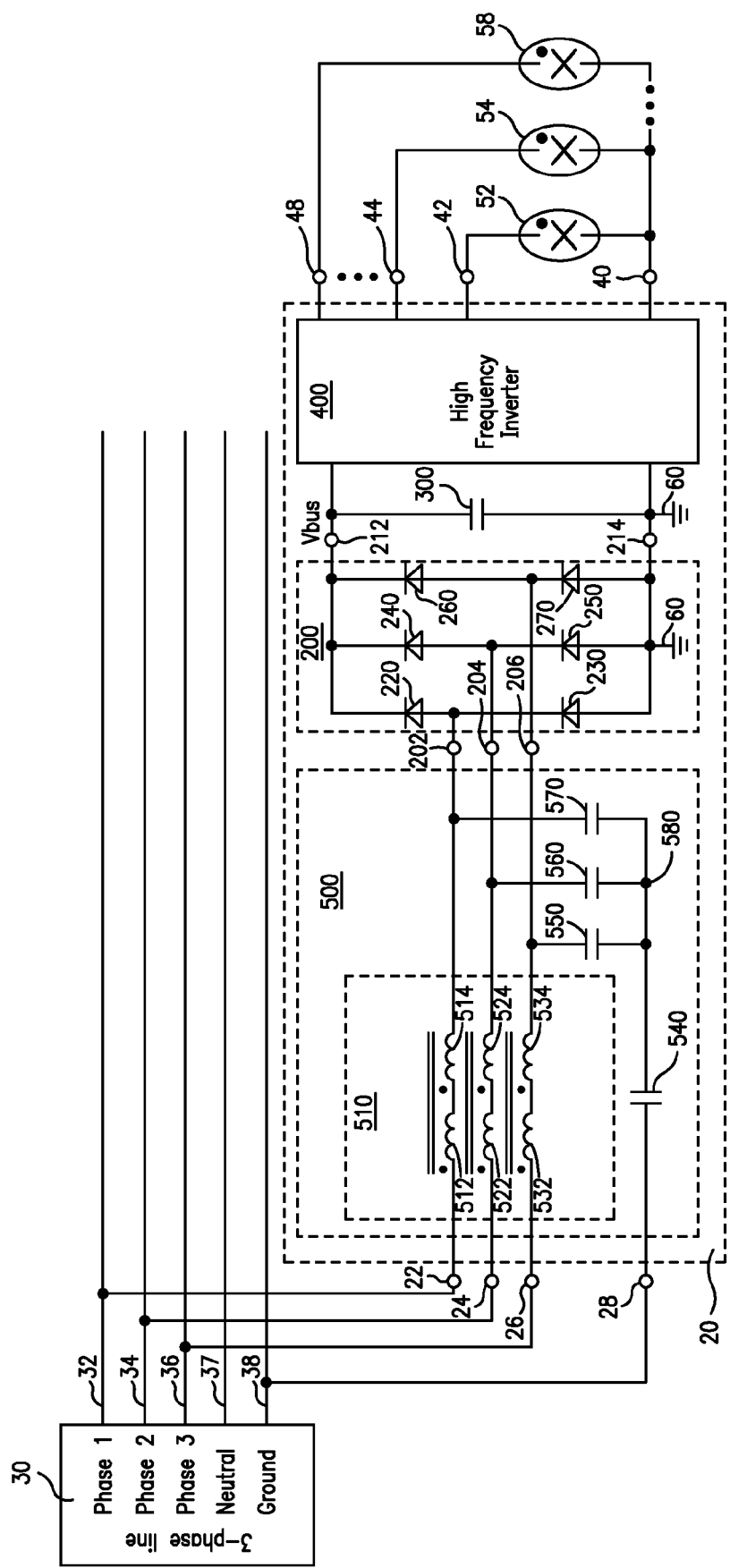
FIG. 2 is a partial electrical diagram of a three-phase electronic ballast with an improved three-phase EMI filter, in accordance with a preferred embodiment of the present invention.

FIG. 2 describes a three-phase electronic ballast 20 for powering one or more gas discharge lamps 52,54, . . . ,58 from a three-phase alternating current (AC) voltage source 30. Ballast 20 includes a rectifier circuit 200, a high frequency bypass capacitor 300, a high frequency inverter 400, and a three-phase EMI filter 500. As will be described in further detail herein, a preferred structure for realizing three-phase EMI filter 500 provides ballast 20 with significant benefits as to cost and operation.

A preferred structure and the detailed operation of ballast 20 (in general) and three-phase EMI filter 500 (in particular) are now described with reference to FIGS. 2 and 3 as follows.

Referring to FIG. 2, rectifier circuit 200 includes first, second, and third input terminals 202,204,206, first and second output terminals 212,214, and first, second, third, fourth, fifth, and sixth diodes 220,230,240,250,260,270. Second output terminal is coupled to circuit ground 60. First diode 220 is coupled between first input terminal 202 and first output terminal 212. Second diode 230 is coupled between second output terminal 214 and first input terminal 202. Third diode 240 is coupled between second input terminal 204 and first output terminal 212. Fourth diode 250 is coupled between second output terminal 214 and second input terminal 204. Fifth diode 260 is coupled between third input terminal 206 and first output terminal 212. Sixth diode 270 is coupled between second output terminal 214 and third input terminal 206. During operation, rectifier circuit 200 receives, by way of three-phase EMI filter 500, the three-phase AC voltage source 30 and provides a rectified output voltage, Vbus, between output terminals 212,214. Additional details regarding the operation of rectifier circuit 200 are disclosed in U.S. Pat. No. 6,906,474 B2 (Trestman et al.), the disclosure of which is incorporated herein by reference.

High frequency filter capacitor 300 is coupled between first and second output terminals 212,214 of rectifier circuit 200. The function of capacitor 300 is to provide an alternating current (AC) path for high frequency current drawn by inverter 400. Additional details regarding the operation and implementation of high frequency bypass capacitor 300 are described in U.S. Pat. No. 6,906,474 B2 (Trestman et al.).

High frequency inverter 400 is coupled to first and second output terminals 212,214 of rectifier circuit 200. During operation, high frequency inverter 400 powers one or more gas discharge lamps. Preferably, high frequency inverter 400 is designed to have an operating frequency that is greater than about 20,000 hertz. In general, inverter 400 includes a plurality of output connections 40,42,44, . . . ,48 for connection to one or more gas discharge lamps 52,54, . . . ,58. Inverter 400 may be realized by any of a number of circuit arrangements (e.g., a half-bridge inverter followed by a series resonant output circuit) that are well known to those skilled in the art of electronic ballasts.

Three-phase EMI filter 500 is coupled between rectifier circuit 200 and three-phase AC voltage source 30. Three-phase EMI filter 500 comprises first, second, third, and fourth input connections 22,24,26,28, a common-mode inductor 510, a Y-capacitor 540, and first, second, and third X-capacitors 570,560,550. First input connection 22 is adapted to receive a first phase 32 of three-phase AC voltage source 30. Second input connection 24 is adapted to receive a second phase 34 of three-phase AC voltage source 30. Third input connection 26 is adapted to receive a third phase 36 of three-phase AC voltage source 30. Fourth input connection 28 is adapted to receive a ground 38 of three-phase AC voltage source 30. A neutral 37 of three-phase AC voltage source 30 has no corresponding connection to ballast 20.

Common-mode inductor assembly 510 includes a first inductor (preferably comprising a winding that is split into a first winding section 512 and a second winding section 514), a second inductor (preferably comprising a winding that is split into a first winding section 522 and a second winding section 524), and a third inductor (preferably comprising a winding that is split into a first winding section 532 and a second winding section 534). First, second, and third inductors (512,514; 522,524; 532,534) are magnetically coupled to each other and are wound upon a common magnetic structure (i.e., one bobbin & one set of cores). First inductor 512,514 is coupled between first input connection 22 and first input terminal 202 of rectifier circuit 200. Second inductor 522,524 is coupled between second input connection 24 and second input terminal 204 of rectifier circuit 200. Third inductor 532,534 is coupled between third input connection 26 and third input terminal 206 of rectifier circuit.

Figure 3:
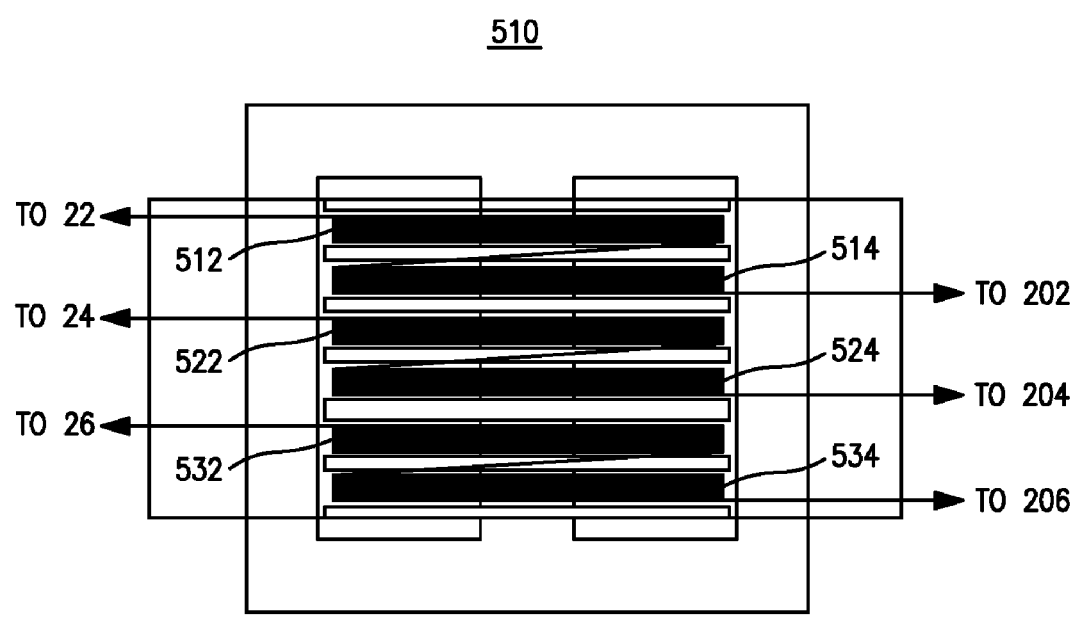
FIG. 3 is top view of a common-mode inductor assembly for use in a three-phase EMI filter, in accordance with a preferred embodiment of the present invention.

Turning now to FIG. 3, common-mode inductor assembly 510 is preferably realized with a physical construction that includes an E-shaped ferrite core assembly (utilizing, e.g., type EF25 cores) and a bobbin that includes six sectors. As illustrated in FIG. 3, each of the windings is disposed about a central leg of the core assembly. More particularly, it is preferred that, in order to provide high impedances of the inductors and in order to maximize EMI attenuation, the core be non-gapped and composed of a suitable material that possesses a high permeability (for instance, high permeability ferrite or Metglas).

The first, second, and third inductors have the same number of wire turns. That being the case, and with the winding(s) for each inductor disposed about the central leg of the core assembly, at any given time, two of the three inductors will produce equal magnetic fields (a.k.a. "B-fields") in the core. More particularly, during operation of ballast 20, at any given instant in time, currents of equal magnitude will be flowing through two of the three inductors within common-mode inductor assembly 510. However, those currents will be of opposing polarities, thereby producing two opposing B-fields in the core. The two opposing B-fields effectively will cancel each other out. Consequently, common-mode inductor assembly 510 may be realized with a non-gapped core (which, as previously described, maximizes the common-mode impedance) without risking magnetic saturation of the core assembly.

As previously alluded to, in a preferred implementation of common-mode inductor 510, each of the first, second, and third inductors is realized by a winding that is split into a first winding section and a second winding section. Referring again to FIG. 3, the winding corresponding to the first inductance is split into a first winding section 512 that occupies a first sector of the bobbin, and a second winding section 514 that occupies a second sector (located adjacent to the first sector) of the bobbin. The winding corresponding to the second inductance is split into a first winding section 522 that occupies a third sector of the bobbin, and a second winding section 524 that occupies a fourth sector (located adjacent to the third sector) of the bobbin. The winding corresponding to the third inductance is split into a first winding section 532 that occupies a fifth sector of the bobbin, and a second winding section 534 that occupies a sixth sector (located adjacent to the fifth sector) of the bobbin. Advantageously, splitting the windings of each of the first, second, and third inductors into two equal winding sections has the benefit of reducing the intrawinding capacitances by a factor of four (4). The resulting decrease in the intrawinding capacitances significantly reduces the transmission of high frequency noise (generated by operation of high frequency inverter 400) into AC voltage source 30.

Referring again to FIG. 2, Y-capacitor 540 is coupled between fourth input connection 28 and a reference node 580. First X-capacitor 570 is coupled between reference node 580 and first input terminal 202 of rectifier circuit 200. Second X-capacitor 560 is coupled between reference node 580 and second input terminal 204 of rectifier circuit 200. Third X-capacitor 550 is coupled between reference node 580 and third input terminal 206 of rectifier circuit 200.

It can be seen from FIG. 2 that Y-capacitor 540 is connected between reference node 580 (which is connected to each of X-capacitors 550,560,570) and (via fourth input connection 28) to ground 38 of AC source 30. During operation of ballast 20, Y-capacitor 540 provides a low impedance path for transferring high frequency noise (generated by operation of inverter 400) to ground 38. Additionally, the preferred connections of capacitors 540,550,560, 570 provide an additional safety benefit by providing an arrangement in which each of the phases 32,34,36 of AC source 30 is separated from ground 38 by at least two capacitors (i.e., first phase 32 is separated from ground 38 by the series combination of X-capacitor 570 and Y-capacitor 540; second phase 34 is separated from ground 38 by the series combination of X-capacitor 560 and Y-capacitor 540;

third phase 36 is separated from ground by the series combination of X-capacitor 550 and Y-capacitor 540).

Figure 1:
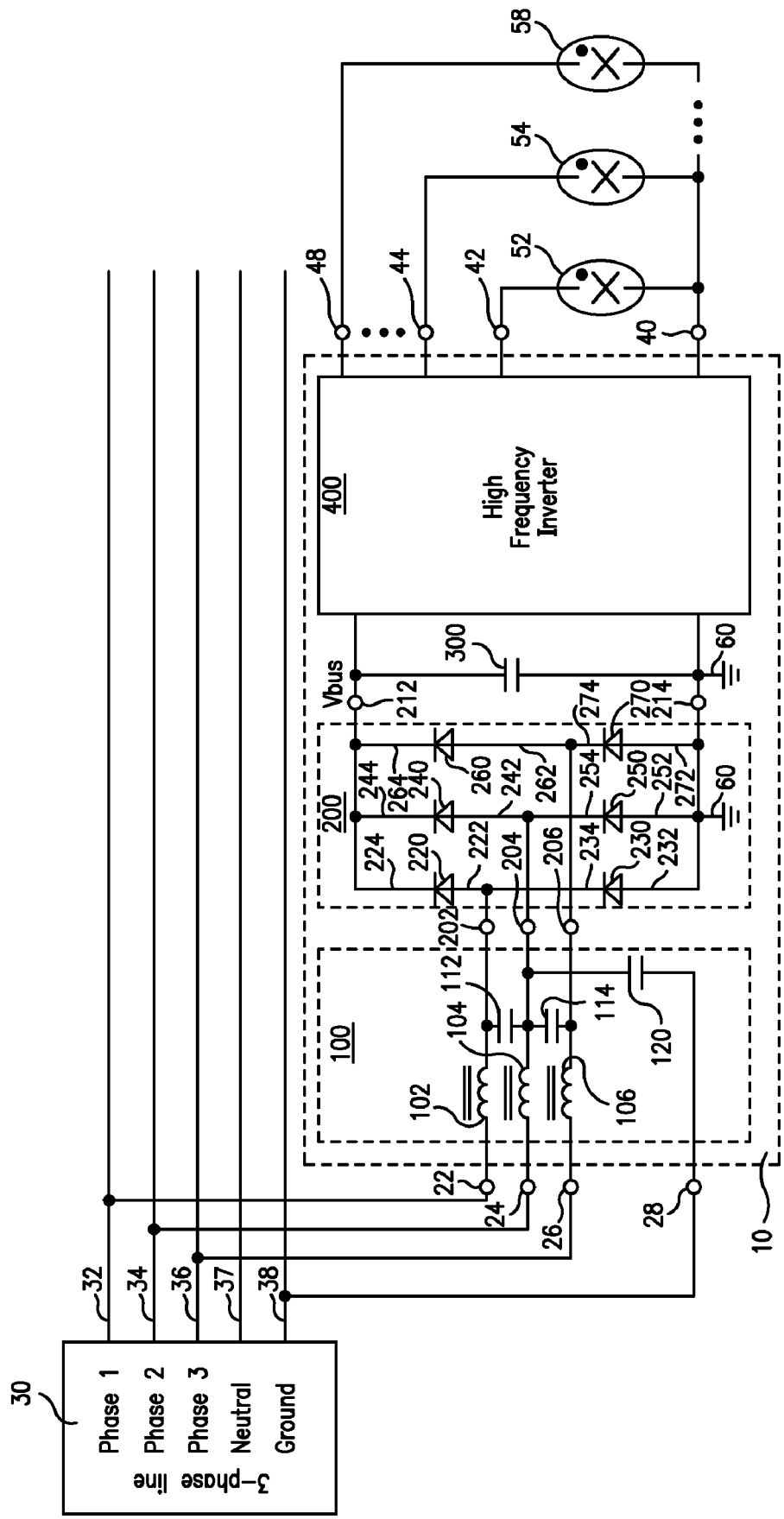
FIG. 1 is a partial electrical diagram of a three-phase electronic ballast, in accordance with the prior art.

It can be seen from FIG. 2 that two of the three X-capacitors are effectively connected in series between each of pair of phases of AC source 30. More particularly: (1) between first phase 32 and second phase 34, there is the series combination of X-capacitor 570 and X-capacitor 560; (2) between second phase 34 and third phase 36, there is the series combination of X-capacitor 560 and X-capacitor 550; (3) between first phase 34 and third phase 36, there is the series combination of X-capacitor 570 and X-capacitor 550. Because each pair of phases of AC source 30 is separated by a series combination of two X-capacitors, each of the X-capacitors may be realized by a capacitor having a voltage rating that is substantially lower than the voltage that exists between each pair of phases. Consequently, by way of example, when AC source 30 has a nominal phase-to-phase voltage of 480 volts rms, each of X-capacitors 550. 560,570 may be realized by capacitors having a voltage rating of 300 VAC. This provides a significant cost benefit, as it allows three-phase EMI filter 500 to be implemented using only three (3) 300 VAC rated X-capacitors (instead of requiring four (4) 300 VAC rated X-capacitors, as in the prior art approach described in FIG. 1).

In a preferred implementation of ballast 20 that is intended for operation with AC source 30 having a nominal phase-to-phase voltage of 480 volts rms, the inductance of each of first, second, and third inductors (512,514; 522,524; 532,534) is selected to be on the order of about 80 millihenries, the capacitance of each of X-capacitors 550,560, 570 is selected to be on the order of about 100 nanofarads (rated at 300 VAC), and the capacitance of Y-capacitor is selected to be on the order of about 3.3 nanofarads (rated at 300 VAC).

Thus, as described herein, ballast 20 includes a three-phase EMI filter 500 that provides significant advantages over the prior art. With regard to cost, three-phase EMI filter 500 includes a common-mode inductor assembly 510 that is wound on a common bobbin & core arrangement that is less costly than the prior art arrangement (which requires three separate differential-mode inductors, each of which requires its own bobbin & core). With further regard to cost, three-phase EMI filter 500 may be realized with one less X-capacitor than the prior art arrangement. With respect to performance, in a preferred construction (e.g., split windings for each of the three inductances) for common-mode inductor assembly 510, three-phase EMI filter 500 provides improved EMI suppression in comparison with the prior art arrangement. The result is three-phase electronic ballast 20 that is substantially more cost-effective than, and that provides improved EMI suppression over, existing approaches.

Although the present invention has been described with reference to certain preferred embodiments, numerous modifications and variations can be made by those skilled in the art without departing from the novel spirit and scope of this invention.

What is claimed is:

1. A ballast for powering at least one gas discharge lamp, the ballast comprising:
   a rectifier circuit, comprising:
      first, second, and third input terminals; and
      first and second output terminals, wherein the second output terminal is coupled to circuit ground;
   a high frequency filter capacitor coupled between the first and second output terminals of the rectifier circuit;
   an inverter coupled to the first and second output terminals of the rectifier circuit, the inverter comprising a plurality of output connections adapted for connection to the at least one gas discharge lamp; and
   a three-phase electromagnetic interference (EMI) filter coupled between the rectifier circuit and a three-phase alternating current (AC) voltage source, the three-phase EMI filter comprising:
      a plurality of input connections, comprising: (i) a first input connection adapted to receive a first phase of the three-phase AC voltage source; (ii) a second input connection adapted to receive a second phase of the three-phase AC voltage source; (iii) a third input connection adapted to receive a third phase of the three-phase AC voltage source; and (iv) a fourth input connection adapted to receive a ground of the three-phase AC voltage source;
      a common-mode inductor assembly, comprising:
         a first inductor coupled between the first input connection and the first input terminal of the rectifier circuit;
         a second inductor coupled between the second input connection and the second input terminal of the rectifier circuit; and
         a third inductor coupled between the third input connection and the third input terminal of the rectifier circuit, wherein the first, second, and third inductors are magnetically coupled to each other;
      a Y-capacitor coupled between the fourth input connection and a reference node;
      a first X-capacitor coupled between the reference node and the first input terminal of the rectifier circuit;
      a second X-capacitor coupled between the reference node and the second input terminal of the rectifier circuit; and
      a third X-capacitor coupled between the reference node and the third input terminal of the rectifier circuit.

2. The ballast of claim 1, wherein each of the first, second, and third inductors have the same number of wire turns.

3. The ballast of claim 1, wherein each of the first, second, and third inductors comprises a winding that is split into a first winding section and a second winding section.

4. The ballast of claim 3, wherein the first winding section and the second winding section have an equal number of wire turns.

5. The ballast of claim 4, wherein the common-mode inductor assembly includes a bobbin having six sectors.

6. The ballast of claim 5, wherein each of the windings for the first, second, and third inductors occupies two adjacent sectors of the bobbin.

7. The ballast of claim 6, wherein the common-mode inductor assembly includes a non-gapped E-shaped core having a high permeability.

8. The ballast of claim 1, wherein each of the first, second, and third inductors has an inductance on the order of at least about 80 millihenries.

9. The ballast of claim 1, wherein the Y-capacitor has a capacitance on the order of about 3.3 nanofarads.

10. The ballast of claim 1, wherein:
    the three-phase AC voltage source has a nominal phase-to-phase voltage of 480 volts rms; and
    each of the first, second, and third X-capacitors is realized by a single capacitor having a voltage rating of about 300 VAC.

11. The ballast of claim 10, wherein each of the first, second, and third X-capacitors has a capacitance on the order of about 100 nanofarads.

12. A ballast for powering at least one gas discharge lamp, the ballast comprising:

a rectifier circuit, comprising:
   first, second, and third input terminals; and
   first and second output terminals, wherein the second output terminal is coupled to circuit ground;
a high frequency filter capacitor coupled between the first and second output terminals of the rectifier circuit;
an inverter coupled to the first and second output terminals of the rectifier circuit, the inverter comprising a plurality of output connections adapted for connection to the at least one gas discharge lamp; and
a three-phase electromagnetic interference (EMI) filter coupled between the rectifier circuit and a three-phase alternating current (AC) voltage source, the three-phase EMI filter comprising:
   a plurality of input connections, comprising: (i) a first input connection adapted to receive a first phase of the three-phase AC voltage source; (ii) a second input connection adapted to receive a second phase of the three-phase AC voltage source; (iii) a third input connection adapted to receive a third phase of the three-phase AC voltage source; and (iv) a fourth input connection adapted to receive a ground of the three-phase AC voltage source;
   a common-mode inductor assembly, comprising:
      a first inductor coupled between the first input connection and the first input terminal of the rectifier circuit;
      a second inductor coupled between the second input connection and the second input terminal of the rectifier circuit; and
      a third inductor coupled between the third input connection and the third input terminal of the rectifier circuit, wherein:
         the first, second, and third inductors are magnetically coupled to each other;
         the common-mode inductor assembly further comprises a bobbin having six sectors; and
         each of the first, second, and third inductors: (i) is split into a first winding section and a second winding section, wherein the first winding section and the second winding section have an equal number of wire turns; and (ii) occupies two adjacent sectors of the bobbin;
   a Y-capacitor coupled between the fourth input connection and a reference node;
   a first X-capacitor coupled between the reference node and the first input terminal of the rectifier circuit;
   a second X-capacitor coupled between the reference node and the second input terminal of the rectifier circuit; and
   a third X-capacitor coupled between the reference node and the third input terminal of the rectifier circuit, wherein each of the first, second, and third X-capacitors is realized by a single capacitor having a voltage rating of no more than about 300 VAC.

13. The ballast of claim 12, wherein the common-mode inductor assembly includes a non-gapped E-shaped core having a high permeability.

14. The ballast of claim 12, wherein each of the first, second, and third inductors has an inductance on the order of at least about 80 millihenries.

15. The ballast of claim 12, wherein the Y-capacitor has a capacitance on the order of about 3.3 nanofarads.

16. The ballast of claim 12, wherein each of the first, second, and third X-capacitors has a capacitance on the order of about 100 nanofarads.

17. A ballast (20) for powering at least one gas discharge lamp from a three-phase alternating current (AC) voltage source (30), the ballast comprising:
   a rectifier circuit (200), comprising:
      first, second, and third input terminals (202,204,206);
      first and second output terminals (212,214), wherein the second output terminal (214) is coupled to circuit ground (60);
      a first diode (220) coupled between the first input terminal (202) and the first output terminal (212);
      a second diode (230) coupled between the second output terminal (214) and the first input terminal (202);
      a third diode (240) coupled between the second input terminal (204) and the first output terminal (212);
      a fourth diode (250) coupled between the second output terminal (214) and the second input terminal (204);
      a fifth diode (260) coupled between the third input terminal (206) and the first output terminal (212); and
      a sixth diode (270) coupled between the second output terminal (214) and the third input terminal (206);
   a three-phase electromagnetic interference (EMI) filter (500) coupled between the rectifier circuit (200) and the three-phase AC voltage source (30), the three-phase EMI filter comprising:
      a plurality of input connections, comprising: (i) a first input connection adapted to receive a first phase of the three-phase AC voltage source; (ii) a second input connection adapted to receive a second phase of the three-phase AC voltage source; (iii) a third input connection adapted to receive a third phase of the three-phase AC voltage source; and (iv) a fourth input connection adapted to receive a ground of the three-phase AC voltage source;
      a common-mode inductor assembly (510), comprising:
         a first inductor (512,514) coupled between the first input connection (22) and the first input terminal (202) of the rectifier circuit (200);
         a second inductor (522,524) coupled between the second input connection (24) and the second input terminal (204) of the rectifier circuit (200);
         a third inductor (532,534) coupled between the third input connection (26) and the third input terminal (206) of the rectifier circuit (200); and
         a bobbin having six sectors;
         wherein:
            (i) the first, second, and third inductors (512,514; 522,524; 532,534) are magnetically coupled to each other and are wound upon a common core assembly;
            (ii) each of the first, second, and third inductors comprises a winding that is split into a first winding section and a second winding section, wherein the first winding section and the second winding section have an equal number of wire turns;
            (iii) each of the windings for the first, second, and third inductors occupies two adjacent sectors of the six-sector bobbin, wherein:
               (a) the first winding section of the first inductor occupies a first sector and the second winding section of the first inductor occupies a second sector that is adjacent to the first sector;

(b) the first winding section of the second inductor occupies a third sector and the second winding section of the second inductor occupies a fourth sector that is adjacent to the third sector; and (c) the first winding section of the third inductor occupies a fifth sector and the second winding section of the third inductor occupies a second sector that is adjacent to the fifth sector;

a Y-capacitor (540) coupled between the fourth input connection (28) and a reference node (580);

a first X-capacitor (570) coupled between the reference node (580) and the first input terminal (202) of the rectifier circuit (200);

a second X-capacitor (560) coupled between the reference node (580) and the second input terminal (204) of the rectifier circuit (200); and a third X-capacitor (550) coupled between the reference node (580) and the third input terminal (206) of the rectifier circuit;

a high frequency filter capacitor (300) coupled between the first and second output terminals (212,214) of the rectifier circuit (200); and an inverter (400) coupled to the first and second output terminals (212,214) of the rectifier circuit (200), wherein the inverter is operable to power the at least one gas discharge lamp (52).

18. The ballast of claim 17, wherein the common-mode inductor assembly includes a non-gapped E-shaped core having a high permeability.

19. The ballast of claim 17, wherein each of the first, second, and third X-capacitors is realized by a single capacitor having a voltage rating of no more than about 300 VAC.

20. The ballast of claim 18, wherein:

each of the first, second, and third X-capacitors has a capacitance on the order of about 100 nanofarads; and the Y-capacitor has a capacitance on the order of about 3.3 nanofarads.

* * * * *